United States Patent
Bengtsson

(10) Patent No.: US 10,458,006 B2
(45) Date of Patent: Oct. 29, 2019

(54) POWDER COMPOSITION AND USE THEREOF

(71) Applicant: HÖGANÄS AB (PUBL), Höganäs (SE)

(72) Inventor: Sven Bengtsson, Höganäs (SE)

(73) Assignee: HÖGANÄS AB (PUBL), Höganäs (SE)

( * ) Notice: Subject to any disclaimer, the term of this patent is extended or adjusted under 35 U.S.C. 154(b) by 106 days.

(21) Appl. No.: 15/559,147

(22) PCT Filed: Mar. 17, 2016

(86) PCT No.: PCT/EP2016/055787
§ 371 (c)(1),
(2) Date: Sep. 18, 2017

(87) PCT Pub. No.: WO2016/146735
PCT Pub. Date: Sep. 22, 2016

(65) Prior Publication Data
US 2018/0066343 A1    Mar. 8, 2018

(30) Foreign Application Priority Data
Mar. 19, 2015    (EP) .................................... 15159773

(51) Int. Cl.
*C22C 19/03*    (2006.01)
*C22C 19/05*    (2006.01)
(Continued)

(52) U.S. Cl.
CPC ............ *C22C 32/0052* (2013.01); *B23K 9/04* (2013.01); *B23K 10/027* (2013.01); *B23K 26/34* (2013.01);
(Continued)

(58) Field of Classification Search
CPC ... C22C 19/058; C22C 32/0052; C23C 24/10; C23C 24/103; B23K 9/04; B23K 10/027; B23K 26/34
(Continued)

(56) References Cited

U.S. PATENT DOCUMENTS 3,785,801 A * 1/1974 Benjamin ................. B22F 9/04
                                                                    419/1
4,711,761 A    12/1987 Liu et al.
(Continued)

FOREIGN PATENT DOCUMENTS

CN    10 4532231    *  4/2015    ............ C22C 30/00
EP    0 476 043 B1    3/1995

OTHER PUBLICATIONS

International Search Report (PCT/ISA/210) dated Jun. 20, 2016, by the European Patent Office as the International Searching Authority for International Application No. PCT/EP2016/055787.
(Continued)

*Primary Examiner* — Patricia L. Hailey
(74) *Attorney, Agent, or Firm* — Buchanan Ingersoll & Rooney P.C.

(57) ABSTRACT

A laser cladding or plasma transferred arc overlay welding process may be used advantageously to apply and to control the material properties of a coating designed for protecting the substrate against wear, corrosion and oxidation at elevated temperature. Furthermore, a laser cladding or plasma transferred arc overlay welding process may be used to apply the coating alloy materials in applications where traditional thermal spray or weld-applied coatings are not practical. By using these welding methods very good bonding is achieved by fusion during welding. At the same time the properties of the clad layer is preserved by the limited dilution typical of these two welding methods compared
(Continued)

traditional overlay welding, by e.g. Gas Tungsten Arc Welding and the like.

10 Claims, 1 Drawing Sheet

(51) Int. Cl.
    *C22C 32/00*     (2006.01)
    *B23K 9/04*     (2006.01)
    *B23K 26/34*     (2014.01)
    *C23C 24/10*     (2006.01)
    *B23K 10/02*     (2006.01)

(52) U.S. Cl.
    CPC ............ *C22C 19/058* (2013.01); *C23C 24/10* (2013.01); *C23C 24/103* (2013.01)

(58) Field of Classification Search
    USPC .......................................... 75/228, 230, 255
    See application file for complete search history.

(56) References Cited

U.S. PATENT DOCUMENTS

| | | | |
|---|---|---|---|
| 4,731,221 A | 3/1988 | Liu | |
| 5,053,074 A * | 10/1991 | Buljan | C22C 29/005 75/232 |
| 5,271,758 A * | 12/1993 | Buljan | C04B 35/117 75/232 |
| 5,441,554 A * | 8/1995 | Romero | C23C 4/08 420/486 |
| 5,787,136 A * | 7/1998 | Miyazaki | C22C 32/0047 376/219 |
| 2004/0076851 A1 | 4/2004 | Aram | |
| 2009/0011252 A1* | 1/2009 | Stein | C23C 16/0272 428/446 |
| 2014/0271319 A1* | 9/2014 | Zheng | B22F 7/04 419/9 |
| 2015/0197842 A1* | 7/2015 | Tang | C23C 10/20 428/666 |
| 2016/0167172 A1* | 6/2016 | Goncharov | B23K 26/342 219/76.12 |

OTHER PUBLICATIONS

Written Opinion (PCT/ISA/237) dated Jun. 20, 2016, by the European Patent Office as the International Searching Authority for International Application No. PCT/EP2016/055787.

Yano et al., "Modification of NiAl Intermetallic Coatings Processed by PTA with Chromium Carbides", ASTM International Journal, Apr. 2011, pp. 190-204, vol. 8, No. 4.

Li et al., "Microstructure and abrasive wear performance of chromium carbide reinforced Ni3Al matrix composite coating", Surface and Coatings Technology, 2007, pp. 4542-4546, vol. 201, No. 8.

Gong et al., "Tribological evaluation on Ni3Al-based alloy and its composites under unlubricated wear condition", Wear Elsevier Science, Jan. 2011, pp. 195-203, vol. 270, No. 3-4.

Cai et al., "Microstructure and mechanical properties of laser surface alloyed coatings prepared on cast Al—Si", Surface Engineering, Apr. 1999, pp. 115-118, vol. 15, No. 2.

* cited by examiner

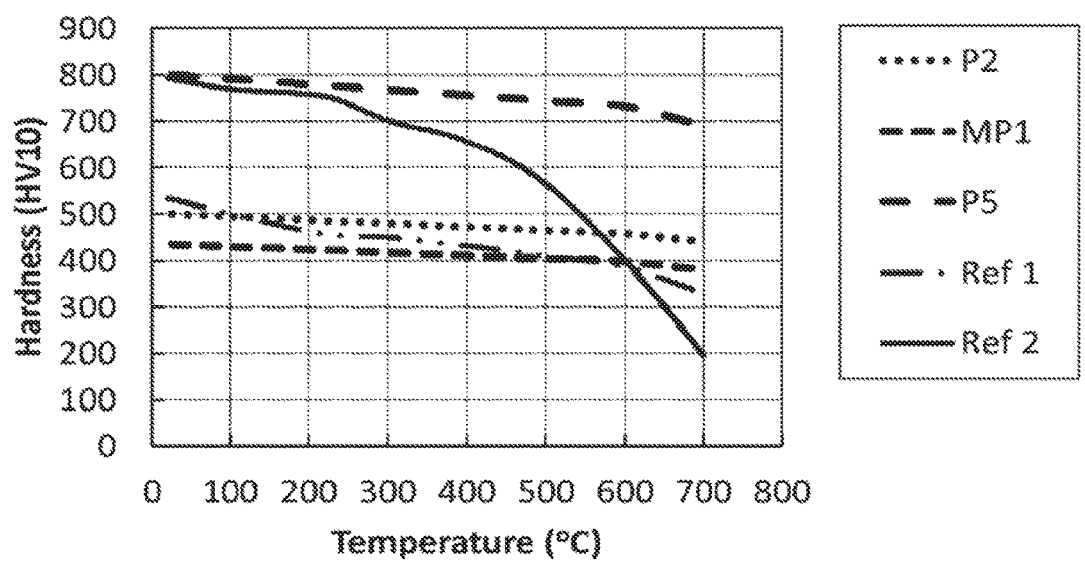

POWDER COMPOSITION AND USE THEREOF

FIELD OF INVENTION

The present invention relates to the field of powder metallurgy, a new metal powder composition, and the use of such a metal powder composition. The composition is used in coating the surface of working components by welding techniques, preferably laser cladding or plasma transferred arc overlay welding, and provides high wear resistance, high hot hardness and high hot oxidation resistance.

BACKGROUND

Wear is one of the main mechanisms limiting the lifetime of mechanical components. There are a number of different wear mechanisms identified. The type of wear mechanism that is active in a particular system depends on load, relative velocities, geometry, lubrication and interacting materials. At higher temperatures the possibility to use oil as lubricant becomes difficult and eventually impossible; furthermore, the yield strength of the material usually drops with increasing temperature, thus decreasing the ability to withstand the wear. Oxidation of the surfaces is also a problem that increases with increasing operating temperature.

The use of Ni-based alloys with additives of chromium and molybdenum to give protection from wear and corrosion has long been known. Such alloys show an improved resistance to wear and corrosion. When even higher hardness and high wear resistance is required, a NiCrSiB alloy mixed with tungsten carbide particles is a viable alternative. The material can be applied by a number of coating methods, such as Gas tungsten arc welding, Laser cladding, Plasma transferred arc, High velocity oxy-fuel spray, Plasma spray, Detonation gun. The different coating methods provide different sets of properties of the coating.

The conventional welding methods for overlay welding provide good fusion and bonding to the substrate, among the more prominent methods are, Shielded Metal Arc Welding (SMAW), Submerged Arc Welding (SAW), Gas Metal Arc Welding (GMAW), and Gas Tungsten Arc Welding (GTAW). One typical drawback of these methods is the large melting of the substrate metal which results in dilution of the coating chemistry which in turn results in deteriorated properties of the coating layer. Another drawback can be the excessive reaction between reinforcing particles, e.g. tungsten carbide, and the melt, resulting is dissolution of carbide particles.

The thermal spray methods provide very low dilution and it is possible to use very high carbide loadings without cracking. The drawbacks are poor bonding sometimes resulting in spalling off of the coating. The cost for the powder is also generally higher since these methods use finer powder which is more expensive compared to coarser powder. Oxides and defects can be found between layers providing weak points during operation. Normally, a layered structure exhibits a lower corrosion resistance compared to a solid material due to preferential attach along the layer boundaries.

Nickel aluminides ($Ni_3Al$ and $NiAl$) are a class of materials that exhibit very good high temperature oxidation resistance due to the spontaneous formation of a tough layer of $Al_2O_3$ on the surface. They also exhibit increased yield strength with increased temperature (EP0476043) and very high work hardening rate. These are all properties that make them particularly suited for applications that are exposed to wear, hot oxidation and hot corrosion. The nickel aluminides are inherently brittle at room temperature, a problem that was counteracted by adding boron (U.S. Pat. No. 4,711,761). By addition of chromium and iron (U.S. Pat. No. 4,731,221) the yield strength and hardness can be further improved.

A number of hard compounds, such as WC, $Cr_3C_2$, NbC, VC, TiC, TaC or virtually any carbide or oxide with a high hardness can be used to reinforce coatings produced by using the above mentioned alloys. However, in order to function as a reinforcing phase a good compatibility to the matrix material must exist. In practice this means that a certain reaction between hard phase and matrix must occur in order to provide wetting and ensure good bonding.

By using thermal spray methods to apply the nickel aluminide and the carbide, the problems of solidification are bypassed. A composite composition consisting of a ceramic hard phase and a matrix consisting of $NiAl/Ni_3Al$ intermetallic phases are used in (US2004/0076851) to manufacture piston rings.

The reaction between hard phase and matrix can be controlled and minimized by using a non-melting method of application, using e.g. a detonation gun (Taylor T A, Overs M P, Quets J M, Tucker R C. Thin Solid Films 1983; 107:427-35.). Still, some drawbacks remain, such as oxidation and decarburization. Aram (US2004/0076851) showed that piston rings could be coated by nickel aluminide and chromium carbide using plasma spray methods.

Duraiselvam et al (Duraiselvam M, Galun R, Wesling V, Mordike B L., J Laser Appl 2006; 18:297) used laser cladding to form a coating from a mixture of WC and Ni/Al powder. Using optimum parameters and post heat treatment they obtained a structure of mainly re-precipitated WC particles in a predominantly $Ni_3Al$ matrix. They tested the cavitation erosion resistance and found that in comparison to the substrate, martensitic stainless steel AR-420, the cavitation resistance for the composite cladding increased 284 times. In fact it was still in the incubation stage when the test was completed.

Luo et al (Li S, Feng D, Luo H., Surf Coatings Technol 2007; 201:4542-6., Luo H, Gong K, Li S-P, Cao X, Zhang X, Feng D, Sino-Swedish Struct. Mater. Symp., 2007, p. 15-20.) used filled a gas-tungsten-arc welding wire with FeB, $Cr_3C_2$ and Al powders and used it to produce overlay welds. The resulting coating consists of a $Ni_3Al$ matrix reinforced with $M_7C_3$ carbides. They found that the coating exhibited significantly high abrasive wear resistance compared to a similar layer produced in Stellite 12.

SUMMARY OF THE INVENTION

The applicant have found that a laser cladding or plasma transferred arc overlay welding process may be used advantageously to apply and to control the material properties of a coating designed for protecting the substrate against wear, corrosion and oxidation at elevated temperature. Furthermore, a laser cladding or plasma transferred arc overlay welding process may be used to apply the coating alloy materials in applications where traditional thermal spray or weld-applied coatings are not practical.

By using these welding methods very good bonding is achieved by fusion during welding. At the same time the properties of the clad layer is preserved by the limited dilution typical of these two welding methods compared traditional overlay welding, by e.g. Gas Tungsten Arc Welding and the like.

The clad structure is a composite consisting of a hard phase and a ductile, strong matrix. The hard phase is $Cr_3C_2$ and/or $M_7C_3$ carbides, were M is Cr, or Fe. The matrix is a nickel aluminide based alloy. The nickel aluminide provides a ductile material with exceptional warm/hot strength and hardness. By selecting a matrix composition in the two-phase region of NiAl and $Ni_3Al$, small variations in the composition will not significantly affect the hardness of the surface coating.

In fact it has been found that by selecting the nickel to aluminum ratio and the chromium to carbon ratio within specified intervals, it is possible to produce coatings by laser cladding and PTA overlay welding for a variety of compositions with properties that are superior to what can be achieved by conventional welding methods or with thermal spray methods.

The properties of the hard phase and the matrix combine to make up a clad layer with very high hot hardness, high hot strength while at the same time exhibit high wear-, oxidation- and corrosion resistance at high temperature.

DETAILED DESCRIPTION

The object of the present invention is to provide a surface coating to a substrate which coating protects against wear, corrosion and oxidation at elevated temperature.

The coatings are typically applied by laser cladding or plasma transferred arc overlay welding. Laser cladding is a surface coating method that uses a laser beam as heating source. The laser beam traverses the surface of the substrate and deposits enough energy to melt both substrate and powder. The powder can either be injected directly into the melt pool or deposited adjacent to the melt pool and subsequently run over by the beam. The advantage of the laser cladding method is a high intensity and stability of the beam. This results in low energy input in comparison to the amount of material melted. Consequences of the low heat input are a high cooling rate, low distortion and low dilution of the clad material by the substrate material. Another consequence is that the stirring in the melt pool is very fast resulting in homogeneous composition of the clad layer. A typical feature of the laser cladding process is that it is possible to find operating parameters where the volume of melted substrate is very small. This phenomenon is called dilution and it should be interpreted as the substrate diluting the coating material. In practice, some dilution is necessary to ensure complete fusion between coating and substrate. A too high dilution will change the chemistry so that the properties of the coating deteriorate. Typical dilution for laser cladding is 2-10%, for PTA 5-15% and for conventional welding, e.g. MIG welding it is >25%.

Plasma transferred arc shares many properties with the laser cladding process. The heat input is higher compared to laser cladding, but not as high as for conventional overlay welding (e.g. MIG welding). This means that cooling rate, distortion, dilution and homogeneity of the clad composition are found somewhere between that of laser cladding and conventional overlay welding.

The use of the coatings is aimed at applications where a combination of elevated temperature corrosion/oxidation resistance as well as wear resistance at this temperature is required. Such applications may include e.g. piston rings for combustion engines, rollers in continuous casting mills, and high temperature valves.

The thickness of the clad layer is typically between 0.3 and 3 mm for a single pass. The lower limit is of practical nature, using laser equipment designed for a small spot or a small PTA flame this size can be decreased further. However, such designs are not suitable for general cladding of large surfaces. The upper limit is related to the total heat input. A thick coating requires more heat per unit length of coating. As the thickness increases the total heat increases and a consequence is that local cooling rate decreases and melt pool size increases. In fact the thermal situation (thermal gradient) approaches that of conventional welding, e.g. MIG welding.

The coating is a composite consisting of a hard phase and a ductile, strong matrix. The hard phase is $Cr_3C_2$ and/or $M_7C_3$ carbides, were M is Cr, or Fe. The matrix is a nickel aluminide based alloy. The matrix material is a two-phase mixture of the two nickel aluminides $Ni_3Al$ and NiAl. The hard phase is $Cr_3C_2$ and/or $M_7C_3$. The $M_3C_7$ phase is basically $Cr_3C_7$ with some Cr substituted by Fe. Iron can be part of the powder or be picked up from the substrate by dilution. Other hard phases, such as VC, NbC, WC can also be included.

The composite material can be formed by mixing powders of the matrix material and the hard phase followed by laser cladding or PTA overlay welding. The bonding between the chromium carbide and the aluminide matrix is normally excellent due to the fact that carbides partially or completely dissolve in the nickel aluminide melt. Another possibility is to melt all the constituents together and directly produce a pre-alloyed homogeneous powder by gas atomization.

Due to the low solubility of carbon in the nickel aluminide matrix, the dissolved carbon precipitates during solidification. The present invention ensures that the carbon precipitates as $Cr_3C_2$ or $M_7C_3$ carbides which provide a sufficient hardness and wear resistance, especially hot wear resistance. The former carbide is practically pure $Cr_3C_2$ since the solubility of other elements is very low. The $M_7C_3$ carbide consists mainly of Cr and C, but also Fe and Ni can take the Cr positions in the lattice.

It has been found that in certain composition windows particularly useful properties are achieved. These windows comprise a two phase region for the hard phases present, $Cr_3C_2$ and $M_7C_3$, and also a two phase region for the matrix where both $Ni_3Al$ and NiAl are found. It is normally desirable to set the composition so that $Cr_3C_2$ is the dominating hard phase and $Ni_3Al$ the dominating matrix phase. In some cases it can be desirable to allow only $M_3C_7$ carbide to be formed due to process considerations.

In this context it is useful to discuss the composition in terms of chromium to carbon ratio and nickel to aluminium ratio in addition to the composition of the elements in weight percent. At a Cr/C ratio of about 6.5 $Cr_3C_2$ is the only hard phase formed. At lower values unwanted graphite is formed and at higher values $M_7C_3$ starts to form concurrently to $Cr_3C_2$. At a ratio of about 12 only $M_7C_3$ is formed and at higher values other unwanted carbides such as $M_{23}C_6$ can be formed.

The $Ni_3Al$ aluminide is hard and ductile, but has very low solubility of other elements, while the NiAl crystal is softer, but more brittle. On the other hand it can dissolve other elements to some extent. In the Ni—Al—Cr—C system a eutectic-like solidification can be found in the two-phase region of $Ni_3Al/NiAl$. The boundaries of this two phase region change slightly with chromium and iron concentration in the alloy. The two phase region starts at the NiAl side at a Ni to Al ratio of about 3.5 and end at the $Ni_3Al$ side at a ratio of 9.5. The NiAl side is fairly constant for different temperatures inside the solidification interval, while the $Ni_3Al$ side moves towards lower values of the ratio at increasing temperature. It is normally desirable to be close to the Ni₃Al side of the region in order to benefit of that higher hardness of the Ni₃Al phase.

If iron is added to the system the hardness of the matrix increases slightly, but more importantly the $M_7C_3$ carbide is favored at the expense of the $Cr_3C_2$ carbide. It is also necessary to allow the Cr/C ratio to increase slightly in order to avoid graphite formation. To some extent the Ni in the Ni₃Al and NiAl can be replaced by Iron. This means that in systems with high iron content the effective Ni/Al ratio is somewhat higher than the nominal due to Fe taking part in the formation of the nickel aluminides.

The nickel aluminide matrix need to be alloyed with a small amount of boron, as described in (U.S. Pat. No. 4,711,761), in order to avoid the environmental brittleness otherwise encountered.

It is possible to add other hard phases to the alloy in order to achieve specific properties. If other strong carbide formers are included, such as vanadium, the Cr to C ratio must be recalculated accordingly.

It is also possible to add other alloying elements to achieve specific properties of the matrix. Certain elements, such as Mn, Ti, Cr, Fe have a grain refining or solution hardening effect on the nickel aluminide.

Furthermore, it is possible to improve the weldability by adding small amounts (0.005-0.2 wt. %) of zirconium to the melt, thus counteracting the possibility of hot cracks caused by having too much boron in the matrix.

The fluidity of the matrix can be improved by adding silicon. Typical amounts are 0.1-1.5 weight percent.

EXAMPLES

The following non-limiting examples are included to further illustrate the invention. The powders were overlay welded using a Coherent 4000 L 4 kW direct diode laser mounted on an ABB industrial robot. For reference three commercially available materials were used: Ref 1, Ref 2 and Ref 3 with details given in Table 1. The first is a CoCrW hard facing material (available from Höganäs AB as 2537-10) characterized by hardness around 41 HRC and good corrosion and high temperature properties. The second is NiCrSiB hard facing alloy (available from Höganäs AB as 1560-00) with hardness around 60 HRC. The third reference material is a mix of a 50 wt. % NiSiB alloy and 50 wt. % tungsten carbide particles (available from Höganäs AB as 1559-50+50% 4580). The hardness of this material exhibits more variation due to the overlay welding process but will be in the range 61-64 HRC.

TABLE 1

Type and composition of the pre-alloyed nickel aluminide powders

| Powder code | Total composition (wt. %) | | | | | | Ni/Al | Cr/C |
| | C | B | Ni | Fe | Cr | Al | others | | |
|---|---|---|---|---|---|---|---|---|---|
| P01 |  | 0.005 | Bal | 10.0 | 8.1 | 10.8 |  | 6.6 | — |
| P02 |  | 0.20 | Bal | 11.6 |  | 9.7 | Mn = 0.50, Ti = 0.50 | 8.0 | — |
| P1 | 2.5 | 0.10 | Bal | 21.1 | 26.1 | 9.2 | V = 0.70 | 4.3 | 10.4 |
| P2 | 2.5 | 0.02 | Bal |  | 30.0 | 9.0 |  | 6.5 | 12.0 |
| P3 | 4.2 | 0.10 | Bal |  | 26.6 | 9.2 |  | 6.5 | 6.5 |
| P4 | 6.7 | 0.02 | Bal | 1.5 | 47.4 | 5.4 |  | 7.3 | 7.1 |
| P5 | 6.7 | 0.10 | Bal | 6.1 | 43.4 | 4.6 | Mn = 0.24, Ti = 0.24 | 8.4 | 6.5 |
| M1 | 1.3 | 0.003 | Bal | 9.0 | 16.0 | 9.7 |  | 6.6 | 12.0 |
| M2 | 1.3 | 0.18 | Bal | 10.5 | 8.7 | 8.7 | Mn = 0.45, Ti = 0.45 | 8.0 | 6.5 |
| M3 | 2.2 | 0.02 | Bal |  | 26.4 | 7.9 |  | 8.0 | 12.0 |
| M4 | 4.0 | 0.002 | Bal | 7.0 | 31.7 | 7.6 |  | 6.6 | 7.9 |
| M5 | 6.7 | 0.002 | Bal | 5.0 | 47.4 | 5.4 |  | 6.6 | 7.1 |
| M6 | 6.7 | 0.10 | Bal | 5.8 | 43.4 | 4.9 | Mn = 0.25, Ti = 0.25 | 8.0 | 6.5 |
| MP1 | 3.3 | 0.01 | Bal | 5.8 | 27.7 | 8.1 |  | 6.8 | 8.3 |
| MP2 | 5.0 | 0.02 | Bal | 3.6 | 37.5 | 6.7 |  | 7.0 | 7.5 |
| MP3 | 5.5 | 0.08 | Bal | 4.5 | 38.5 | 5.2 | Mn = 0.18, Ti = 0.18 | 8.7 | 7.0 |
| MP4 | 6.6 | 0.01 | Bal |  | 49.7 | 4.5 |  | 8.7 | 7.6 |
| Ref 1 | 1.1 | — | 2.8 | 1.5 | 27.0 | — | Co = bal, Si = 1.0, W = 4.4 |  |  |
| Ref 2 | 0.8 | 3.1 | Bal | 3.7 | 14.8 | — | Si = 4.3 |  |  |
| Ref 3 | 3.1 | 1.4 | Bal | 0.1 | — | — | Si = 1.5, W = 47 |  |  |

Example 1

An atomized nickel aluminide powder with the composition in Table 1, material P01 was mixed with $Cr_3C_2$ powder, in several variants, M1 to M6, and used for laser cladding of steel plates. During the cladding the aluminide powder melts while the chromium carbide partially dissolves in the melt. During solidification carbides are formed in a eutectic reaction forming bundles of rod like carbides. The size and shape of these carbides remain the same for a wide variety of operating parameters.

The hardness of the laser clad coating was measured using a Duromatic, Durometer type Alpha hardness tester. The test method used was: Metallic materials—Rockwell hardness test—Part 1: Test method (scales A, B, C, D, E, F, G, H, K, N, T) (ISO 6508-1:2005). The hardness of the resulting clad is mainly controlled by the amount of carbide present. The mix constituents of the powder and the hardness of the clad layers are shown in Table 2.

TABLE 2

Hardness of coatings produced by laser cladding of mixtures of nickel aluminide powder and chromium carbide powder

| Material | Mix constituents (wt. %) | Hardness (HRC) |
|---|---|---|
| M1 | P01 + 10% $Cr_3C_2$ carbides | 41 |
| M2 | P02 + 10% $Cr_3C_2$ carbides | 45 |
| M3 | P2 + 12% Ni | 61 |
| M4 | P01 + 30% $Cr_3C_2$ carbides | 51 |
| M5 | P01 + 50% $Cr_3C_2$ carbides | 58 |
| M6 | P01 + 50% $Cr_3C_2$ carbides | 60 |

TABLE 2-continued

Hardness of coatings produced by laser cladding of mixtures of nickel aluminide powder and chromium carbide powder

| Material | Mix constituents (wt. %) | Hardness (HRC) |
|---|---|---|
| Ref 1 | CoCrW type Available from Höganäs AB: 2537-10 | 41 |
| Ref 2 | NiCrSiB type Available from Höganäs AB: 1560-00 | 62 |
| Ref 3 | NiSiB + WC type Available from Höganäs AB: 1559-50 + 50% 4580 | 61-64 |

Example 2

Nickel aluminide with added chromium and carbon was atomized into the compositions in Table 1, materials P1, P2, P4, and P5. These materials were used for laser cladding of steel plates. The powders melts completely and during solidification carbides are re-formed in a eutectic reaction forming bundles of rod like carbides. The size and shape of these carbides remain the same for a wide variety of operating parameters.

The hardness of the laser clad coating was measured using a Duromatic, Durometer type Alpha hardness tester. The test method used was: Metallic materials—Rockwell hardness test—Part 1: Test method (scales A, B, C, D, E, F, G, H, K, N, T) (ISO 6508-1:2005). The hardness of the resulting clad is mainly controlled by the amount of carbide present. The hardness is shown in Table 3.

TABLE 3

Hardness of coatings produced by laser cladding using pre-alloyed powders

| Material | Hardness (HRC) |
|---|---|
| P1 | 50 |
| P2 | 49 |
| P3 | 55 |
| P4 | 62 |
| P5 | 64 |
| Ref 1 | 41 |
| Ref 2 | 62 |

Example 3

Atomized pre-alloyed powders were mixed according to Table 4 into mixes MP1, MP2, MP3 and MP4. The powders melt completely and during solidification carbides are re-formed. The carbides form in bundles of rod shaped carbide particles. The size and shape of the carbides remains the same for a wide variety of processing conditions.

The hardness of the laser clad coating was measured using a Duromatic, Durometer type Alpha hardness tester. The test method used was: Metallic materials—Rockwell hardness test—Part 1: Test method (scales A, B, C, D, E, F, G, H, K, N, T) (ISO 6508-1:2005). The hardness of the resulting clad is mainly controlled by the amount of carbide present. The mix constituents of the powder mixes used and the hardness of the clad layer are shown in Table 4.

TABLE 4

Hardness of coatings produced by laser cladding using mixes of pre-alloyed powders

| Material | Mix constituents (wt. %) | Hardness (HRC) |
|---|---|---|
| MP1 | P01 + 50% P4 | 44 |
| MP2 | P01 + 75% P4 | 60 |
| MP3 | P5 + 20% P2 + 5% Ni | 61 |
| MP4 | P2 + 50% $Cr_3C_2$ + 10% Ni | 60 |
| Ref 1 | CoCrW type Available from Höganäs AB: 2537-10 | 41 |
| Ref 2 | NiCrSiB type Available from Höganäs AB: 1560-00 | 62 |

Example 4

Three powders with compositions found in Table 1, were used for overlay welding by the plasma transferred arc (PTA) method on mild steel plates. During the cladding using the mix M4 the aluminide powder melts while the chromium carbide partially dissolves in the melt. During solidification carbides are formed in a eutectic reaction forming bundles of rod like carbides. The size and shape of these carbides remain the same for a wide variety of operating parameters. The pre-alloyed powders P2 and P5 melt completely and during solidification carbides are re-formed in a eutectic reaction forming bundles of rod like carbides. Also in this case is the size and shape of these carbides the same for a wide variety of operating parameters.

The hardness of the laser clad coating was measured using a Duromatic, Durometer type Alpha hardness tester. The test method used was: Metallic materials—Rockwell hardness test—Part 1: Test method (scales A, B, C, D, E, F, G, H, K, N, T) (ISO 6508-1:2005). The hardness of the resulting clad is mainly controlled by the amount of carbide present. In Table 5, the hardness of the layer is found.

TABLE 5

Hardness of coatings produced by plasma transferred arc overlay welding

| Material | Hardness (HRC) |
|---|---|
| P2 | 49 |
| M4 | 45 |

Example 5

Three powders with compositions found in Table 1 were used for laser cladding on mild steel plates. During the cladding using the mix M4 the aluminide powder melts while the chromium carbide partially dissolves in the melt. During solidification carbides are formed in a eutectic reaction forming bundles of rod like carbides. The size and shape of these carbides remain the same for a wide variety of operating parameters. The pre-alloyed powders P2 and P5 melt completely and during solidification carbides are re-formed in a eutectic reaction forming bundles of rod like carbides. Also in this case is the size and shape of these carbides the same for a wide variety of operating parameters.

Hot Hardness Testing

Hot hardness may be measured as a function of temperature by using a Bofors Hot hardness tester. The hardness tester may consist of a vacuum vessel that contains a furnace capable of reaching 700° C. and the Vickers hardness testing device. The furnace may be set to a specified temperature and the specimen is allowed to reach the temperature before an indent can be made. This procedure is repeated for each temperature. After the indents at all temperatures are made the temperature is allowed to drop to room temperature after which the sample can be removed. The size of the indents is measured in an optical microscope. The hardness testing is following the standard: Metallic materials—Vickers hardness test—Part 1: Test method (ISO 6507-1:2005).

Example 6

Three powders (P01, P1, and P2) with compositions found in Table 1, were used for laser cladding on mild steel plates.

Wear Testing

The wear testing follows norm ASTM G77—Standard Test Method for Ranking Resistance of Materials to Sliding Wear Using Block-on-Ring Wear Test. A cantilever system press the test block with a pre-defined normal load onto the counter crowned cylindrical ring driven by an AC geared motor with a pre-defined rotational velocity. A load cell acquires friction force while a displacement transducer acquires linear wear in the block-on-ring contact. In this test set-up, the block elliptic contact surface achieves much longer sliding distance in comparison to the test ring where large number of elliptic contact surfaces form a groove. Therefore the ring wear is much lower and normally neglected. The rings are made from grey cast iron. The test runs are performed at several sliding velocities between 0.045, and 2.9 m/s which illustrate velocities from low to high sliding velocities for dry/unlubricated sliding contacts. Total sliding distance exceeds 1000 m. Two test loads are used, 6 and 52 N. The wear rate ($mm^3/(Nm)$) is expressed as volume loss normalized to load and sliding distance. Before the test round, both the block and rings are carefully cleaned and degreased with ethanol.

Wear Test Results

The wear tests of materials P01, P1, and P2 show the advantageous behavior of the present invention, see Table 6. At low sliding velocities, plasticity dominated wear dominates for all the materials, while at high velocities a transition occurs to oxidational wear. Comparing material P01 and P1 it can be seen that the coefficient of friction in the plasticity dominated regime is about 0.8 for the P01 material while for the P1 material it varies from 0.4 to 0.7. The high value is found near the transition between plasticity dominated wear and oxidational wear. Furthermore, the wear rate is two orders of magnitude lower for the P1 material. In the oxidational wear regime above about 1.1 m/s the coefficient of friction is 0.4 and 0.25 for the P01 and P1 materials respectively. The wear rates also exhibit a favorable behavior in that the P1 exhibit a wear rate one order of magnitude lower compared to P01.

TABLE 6

Wear test results

| | Plasticity dominated wear | | | Oxidative wear dominated | | |
| --- | --- | --- | --- | --- | --- | --- |
| Material | Velocity interval (m/s) | Coefficient of friction (—) | Wear rate ($mm^3/Nm$) | Velocity interval (m/s) | Coefficient of friction (—) | Wear rate ($mm^3/Nm$) |
| P01 | 0.045-0.37 | 0.8 | $10^{-4}$ | 1.1-2.9 | 0.4 | $10^{-5}$ |
| P1 | 0.045-1.1 | 0.4-0.7 | $10^{-6}$ | -2.9 | 0.25 | $10^{-6}$ |
| P2 | 0.045-1.1 | 0.4-0.6 | $10^{-5}$ | -2.9 | 0.4 | $10^{-6}$ |

The invention claimed is:

1. A powder composition containing Al, Cr, C and B and optionally at least one of the following: Fe, Mn, Ti and Zr, wherein the weight ratio between Cr and C is between 6.5 and 12 and the weight ratio of Ni/Al is between 4.2 and 9.5; the balance being Ni, and unavoidable impurities.

2. Powder composition according to claim 1, having the following amounts of elements:
Al 4.5-11 wt-%;
Cr 8-48 wt-%;
C 1-6.7 wt-%;
B 0.002-0.5 wt-%;
Fe 0-15% wt-%;
Mn 0-1% wt-%;
Ti 0-1% wt-%;
V 0-1 wt %;
Zr 0-0.5 wt-%;
the balance being Ni and unavoidable impurities.

3. Powder composition according to claim 1 wherein the Cr content is between 40 wt-% and 50 wt-%.

4. Powder composition according to claim 1, wherein the Cr content is between 20 wt-% and 30 wt-%.

5. Powder composition according to claim 1, wherein the Cr and C are present in the form of $Cr_3C_2$ or $Cr_7C_3$ or a mixture of these, and the Ni and Al are present in the form of $Ni_3Al$ or NiAl or a mixture of these.

6. Powder composition according to claim 1, wherein all constituents are pre-alloyed.

7. A surface coating method comprising coating a surface with a powder composition according to claim 1.

8. The method according to claim 7, wherein the coating comprises laser cladding or plasma transferred arc overlay welding.

9. Component having a surface coating manufactured by the method according to claim 7.

10. A powder composition consisting of
Al,
Cr,
C,
B,
optionally at least one of Fe, Mn, Ti and Zr, and
the balance being Ni, and unavoidable impurities,
wherein the weight ratio between Cr and C is between 6.5 and 12, and
wherein the weight ratio of Ni/Al is between 4.2 and 9.5.

* * * * *